United States Patent [19]

Lazarus et al.

[11] 4,296,132

[45] Oct. 20, 1981

[54] DOG FOOD OF IMPROVED ACCEPTABILITY

[75] Inventors: Charles R. Lazarus, Ossining; Howard D. Stahl, Hartsdale, both of N.Y.; Gerhard J. Haas, Woodcliff Lake, N.J.

[73] Assignee: General Foods Corporation, White Plains, N.Y.

[21] Appl. No.: 129,875

[22] Filed: Mar. 13, 1980

[51] Int. Cl.³ .................... A23K 1/00; A23K 1/18
[52] U.S. Cl. ............................ 426/2; 426/307; 426/623; 426/630; 426/635
[58] Field of Search .............. 426/2, 74, 72, 302, 426/307, 623, 630, 635, 454, 805, 807

[56] References Cited

U.S. PATENT DOCUMENTS

| | | | |
|---|---|---|---|
| 3,051,571 | 8/1962 | Pergament | 426/454 |
| 3,119,691 | 1/1964 | Ludington et al. | 426/302 X |
| 3,745,023 | 7/1973 | Greenberg et al. | 426/805 X |
| 3,857,968 | 12/1974 | Haas et al. | 426/805 X |

OTHER PUBLICATIONS

Rose et al., "The Condensed Chemical Dictionary" van Nostrand Reinhold Co. (1970) pp. 166 and 576.
Fenaroli "Handbook of Flavor Ingredients" Chemical Rubber Co. (1971) pp. 760-761.

*Primary Examiner*—R. B. Penland
*Attorney, Agent, or Firm*—Mitchell E. Alter; Daniel J. Donovan; Thomas R. Savoie

[57] ABSTRACT

The object of the invention is to provide a dog food of improved acceptability.

Dog foods, no matter how nutritious, must be palatable for the dogs to receive the proper nutrition. This invention provides a dog food of improved palatability by the use of magnesium oleate as a palatant. The preferred embodiment employs magnesium oleate in a surface fat coating to enhance the palatability of a dry dog food. Levels of about 0.2% to about 0.4% based on the total weight of the food are most preferred.

9 Claims, No Drawings

DOG FOOD OF IMPROVED ACCEPTABILITY

DESCRIPTION

Technical Field

The present invention relates to dog foods, and particularly to dog foods having additives which make them more acceptable.

Dog foods provide a convenient and popular means for assuring proper feeding. While the art is well aware of the nutritional requirements of dogs and is experienced in making rations which are balanced to provide complete nutrition when eaten, the foods must be made sufficiently palatable for the dogs to assure that they are eaten in the required amounts. When not eaten, the dog's natural instincts take over and the planned rations are supplemented by whatever other food may be available. This supplemental food may typically come from garbage cans, small live animals, and the like. While the search for foods of this type adds variety to the dog's life as well as its diet, this variety can be the cause of social as well as dietary concern.

The problem of ration rejection due to poor palatability is most severe with economy dog foods, especially those sold in dry form. With some success, pet food manufacturers have used palatability improving additives to make low cost rations having adequate acceptability. The use of these additives makes it possible to use, as raw materials, high proportions of ingredients which are undesirable or even unfit for human consumption and which might be otherwise unpalatable to pets. The ability to improve the palatability of pet foods made of less desirable raw materials helps maintain the lowest possible cost for human foods by decreasing the demand for the more choice raw materials and increasing the economic value of the by-products of the human food industry.

Among the prior art efforts to use palatability improving additives is the approach described by G. J. Haas et al in U.S. Pat. No. 3,857,968. Therein a palatability improving composition comprising fat and protein, which has been conditioned by emulsifying the fat and treating the mixture with an enzyme mixture comprising lipase and protease, is incorporated into a pet food in an amount effective to improve the palatability of the food. It is known that free fatty acids and amino acids are liberated by the enzymatic reactions; however, the exact reason for the improvement in palatability obtained according to the teachings of the patent is not disclosed. It is noted that the starting materials are typical dietary components, and the enzymatic and possible side reactions may heighten their natural attractiveness.

Another prior art teaching palatability improving additives is the approach also described by G. J. Haas et al. in U.S. Patent Application Ser. No. 064,951, filed Aug. 8, 1979. Therein, a palatability-improving composition comprising saponified fat is incorporated into a pet food in an amount effective to improve the palability of the food. It is disclosed that saponification of fat with both potassium hydroxide and sodium hydroxide yield a palatability-improving composition; however, the exact reason for improvement in palatability obtained, according to the teachings of the patent, is not disclosed.

In another prior art teaching, Greenberg et al in U.S. Pat. No. 3,745,023, discloses that a specially treated fat preparation can improve palatability when applied to pet foods. The patentees suggest that a high concentration of free fatty acids in the fat promotes palatability. However, the specific free fatty acids responsible are not identified and are apparently present in their normal relative amounts.

Another prior art teaching, Pergament in U.S. Pat. No. 3,051,571, discloses that a specially treated fat preparation can provide a high caloric ingredient when dusted onto poultry feed. The patentee discloses saponification with calcium hydroxide to produce a fat and water insoluble and nonemulsifiable free fatty acid. The particular feeds produced are not designed for use with dogs, nor is there any suggestion in this reference that one could expect to improve the palatability of a dog food.

Other publications have suggested that certain free fatty acids in combination with lipids or combinations of these are particularly advantageous. For example, United Kingdom Patent Specification 1,293,378 discloses what is said to be a synergistic mixture of squalene, oleyl alcohol, oleic acid and linoleic acid for improving the acceptability of livestock and pet foods. Similarly, Netherlands patent publication 73-13644 discloses that specific free fatty acids, namely caprylic and caproic, improve the aroma of dog foods.

Each of these publications asserts to some degree that their respective findings provide improvement in foods by selectively altering food components or their relative proportion in comparison to naturally occuring food products. Another important aspect of flavor enhancement of commercial food products is the ability to incorporate the palatability improver uniformly throughout a production lot. Unless all product is improved substantially uniformly, the benefit of the additive may be lost.

DISCLOSURE OF INVENTION

In accordance with the present invention, an improved, nutritionally-balanced dog food is provided which comprises fat, protein, carbohydrates, vitamins and minerals, wherein the improvement comprises: magnesium oleate in admixture with at least a portion of the fat, the magnesium oleate being present in an amount effective to increase the palatability of the dog food for dogs.

The term palatability is taken in its broad sense of improving the overall acceptance of a food by a dog. The exact mechanism for this improved acceptance has not been determined. However, it is likely that an improved taste, as opposed to improved aroma or texture, is responsible for the increased palatability the invention provides.

While the palatability of a wide variety of dog foods can be improved according to the present invention, the following description will relate to a dry dog food which is nutritionally balanced for normal adult dogs. The dog food specifically referred to herein is made essentially as described in U.S. Pat. No. 3,119,691; however, dry dog foods of other varieties can also be improved. Dry dog foods are characterized by relatively low moisture contents of less than 15%, preferably less than 8%. Foods of this type can be significantly improved by the invention. A distinct advantage in the use of magnesium oleate is that it is fat soluble which facilitates its application onto dry pet foods. Moreover, magnesium oleate can be added to canned or intermediate moisture foods to improve their palatability. U.S. Pat. No. 3,202,514 to Burgess et al describes typical intermediate moisture foods, having moisture contents of from 15 to 30%. Other intermediate moisture foods, with moistures up to 50% can also be improved. The canned foods come in a variety of flavors, formulations and forms, and typically have moisture contents above 50%.

Because providing proper nutrition is essential, it is important to formulate all dog foods to be nutritionally complete. By nutritionally balancing each individual food ration, it is not then necessary for the dog owner to balance the quantities of different foods supplies. In this manner, the nutritional intake of the dog is assured as long as it intakes a minimum amount of food. Nutritionally-balanced dog foods contain protein, carbohydrates, fats, vitamins, and minerals in the amounts known in the art and established by feeding tests to be sufficient for the proper growth and maintenance of the dog.

Dog foods of the type described in U.S. Pat. No. 3,119,691 are coated with a water-soluble, gravy-forming material and a layer of fat. The magnesium oleate palatant advantageously disperses well in fat and can be mixed with this fat coating to provide uniform application to the surface of the food. Adding the magnesium oleate to the surface fat coating is further advantageous because it places this flavorful mateiral where it will have the greatest impact, thereby providing the greatest improvement with the smallest amount of magnesium oleate. If desired, the magnesium oleate can be added to a portion of fat which is blended within the dog food; however, this is not preferred.

The fat coatings on dog foods of the type described by U.S. Pat. No. 3,119,651 will typically comprise from 2 to 8%, preferably 3-6%, of the weight of the dog food. The fat can be selected from any of the animal or vegetable fats which are acceptable to dogs. Among the animal fats are chicken fat, tallow, lard, butter oil, and the like. Among the vegetable fats are soybean oil, cottonseed oil, coconut oil, corn oil, and the like. The animal fats are preferred due to their higher palatability and lower cost.

It is important to the successful accomplishment of the improvements of the present invention that the fat be free of other materials which may detract from the improvement that magnesium oleate would otherwise provide. It has been recognized in tests that the presence in the fat of certain materials, otherwise acceptable or even considered palatants, may diminish or negate the palatability improving properties of magnesium oleate. For example in one series of tests magnesium oleate increased the palatability of dry dog food when added to a fat coating at levels of 0.2% and 0.4% based on the total weight of the food; however, this was negated when the magnesium oleate was added to a dog food having a fat coating already containing a palatant prepared in the manner set out in U.S. Pat. No. 3,857,968. Accordingly, the fat portion of the dog food will consist essentially of a fat, preferably an animal fat, and will not contain a sufficient level of other materials which negates the positive effect of the magnesium oleate. The determination of whether particular fats are suitable in this regard can be determined by a controlled feeding study designed to give statistically significant results.

The fat can be applied to the surface of the dog food in any suitable manner. For example, the magnesium oleate can be dissolved in a fat such as bleachable fancy tallow and then sprayed into a rotating drum which maintains dog food kibbles or chunks in constant tumbling. By virtue of being fat soluble, magnesium oleate has a distinct advantage over prior art palatants of the type previous described. Magnesium oleate does not require the addition of water to facilitate external application to a pet food product. Thus, in the case of dry dog food products, moisture levels are more readily controlled, resulting in a product that retains its dry character and does not become soggy or sponge-like merely because of the addition of a palatant. Moreover, if desired, the fat can be emulsified prior to application to further improve the impact of the fat and magnesium oleate. When emulsified, the fat to water ratio can be employed at any effective level, and will typically be within the range of from 1:5 to 1:1. When emulsified an additional drying step may be required in the case of dry dog foods to reduce their moisture contents to the desired low level.

The magnesium oleate is incorporated into the dog food in any amount which is effective to improve the palatability of the dog food when fed to dogs. The exact amount will depend upon the particular formulation of the food, the suggested manner of feeding, and the manner of incorporating the palatant. For example, the level of magnesium oleate required for palatability improvement will vary depending on whether it is applied to the fat coating on the surface of the food or internally. Also, the results may vary depending on whether the food is fed dry or with water. And, as pointed out above, there are certain dog food ingredients such as those disclosed in U.S. Pat. No. 3,857,968, which nullify the improvement normally obtained by magnesium oleate. Typically, levels of up to about 0.5% based on the weight of the dog food will be effective for external applications. When added as a part of a fat coating on dry pet foods made in compliance of the teachings of U.S. Pat. No. 3,119,651 and fed with an equal quantity of water to normal adult dogs, levels of about 0.2 to 0.4 wt% have been found to be effective. When similarly applied, but fed dry, the 0.2 wt% level is preferred. The exact level chosen will also depend upon a balancing of cost and effectiveness. Thus, non-optimum levels from the standpoint of effectiveness may be commercially preferred.

Because of the improved acceptance obtainable by employing magnesium oleate as a part of the pet food formulation, the process for feeding dogs can be improved. Specifically, the improved process for feeding a dog comprises: preparing a pet food improved according to the invention, and feeding the food to a dog. As described above, the level of magnesium oleate added may vary depending upon whether the food is served with water or dry. Thus, the food should be formulated with this in mind.

Best Mode for Carrying Out The Invention

The following examples set forth the best mode for carrying out the present invention. These examples are intended to aid in describing the invention to those skilled in the art and are not to be taken as limiting in any regard. Unless otherwise indicated, all parts and percentages are by weight.

EXAMPLE 1

According to this example, the effect of magnesium oleate on the palatability of a dry dog food having an external fat coating and fed with an equal quantity of water is tested.

As the base dog food, an uncoated, extruder-kibbled product which forms the core of a commercially-available Gravy Train ® brand dog food is employed. This formulation is processed in the manner described in the aforementioned U.S. Pat. No. 3,119,691 except that the coating is omitted. To prepare a test food according to the present invention, magnesium oleate is added to melted bleachable fancy tallow in the proper porportion, and the mixture of fat and magnesium oleate is then sprayed onto the kibbled dog food as it is tumbled in a rotating drum. A control product is prepared in the same manner, but without the magnesium oleate. The magnesium oleate was obtained from The Shepherd Chemical Company, Cincinnati, Ohio.

A total of 5 tests were run comparing products of the invention fed with an equal quantity of water to a control product similarly fed. Both control and test products had a fat coating amounting to 4% of the total weight of the dog food. The test products included the indicated levels of magnesium oleate. Except as indicated, the foods were fed over a period of two days to a panel of 30 dogs. On the second day of each test, the position of the pans holding the foods were reversed to eliminate positional bias. The dogs were allowed to eat as much of either food as they wanted and the total consumption of each was noted. The results below are expressed in terms of an average preference ratio which is calculated by dividing the quantity of test food consumed by the total quantity of food consumed. Values greater than 0.5 indicate a preference for the test food. The results are as follows:

| Magnesium Oleate (weight percent) | Average Preference Ratio |
|---|---|
| *0.2 | .65 |
| 0.2 | .76 |
| 0.4 | .63 |
| 0.4 | .36 |
| 0.4 | .69 |

*60 dogs fed one day.

These tests were then repeated using 1%, total weight basis, of the palatant described in U.S. Pat. No. 3,857,968 in place of an equal quantity of bleachable fancy tallow. Thus, Product A had a coating of 3% bleachable fancy tallow and 1% palatant described in U.S. Pat. No. 3,857,968 and 0.4% magnesium oleate was compared against Product B which had a coating of 3% bleachable fancy tallow and 1% palatant described in U.S. Pat. No. 3,857,968. Here, product B was slightly preferred.

EXAMPLE 2

This example repeats the procedure of Example 1, but this time the samples are fed dry to 60 dogs for one day and the coating comprised 5% of the total weight of the dog food. The results are summarized below:

| Magnesium Oleate (weight percent) | Average Preference Ratio |
|---|---|
| 0.2 | .80 |
| 0.4 | .35 |
| 0.6 | .19 |

Again, here the tests were repeated employing varying levels of the palatant of U.S. Pat. No. 3,857,968 in place of equal levels of bleachable fancy tallow, and these tests also indicated no enhancement of palatability of from the original results.

The above disclosure is presented for the purpose of teaching those skilled in the art how to practice the present invention and does not attempt to describe all those modifications and variations of the invention which will become apparent to those skilled in the art upon reading the disclosure. It is intended, however, that all such modifications and variations be included within the scope of the invention which is defined by the following claims.

What is claimed is:

1. An improved, nutritionally-balanced dog food comprising fat, protein, carbohydrates, vitamins and minerals wherein the improvement consists of magnesium oleate in admixture with at least a portion of the fat, the magnesium oleate being present in an amount effective to improve the palatability of the dog food for dogs.

2. An improved dog food according to claim 1 wherein the moisture content of the dog food is less than 15%, based on the weight of the total food.

3. An improved dog food according to claim 1 wherein the magnesium oleate is blended with a fat prior to being coated on the surface of the dog food, the fat coating comprising from 2 to 8% of the total weight of the food.

4. An improved dog food according to claim 1 wherein the magnesium oleate is employed at a level of from 0.1 to 0.4%, based on the total weight of the food.

5. An improved dog food according to claim 4 wherein the moisture content of the dog food is less than 15%, based on the total weight of the food.

6. An improved dog food according to claim 5 wherein the magnesium oleate is blended with a fat prior to being coated on the surface of the dog food, the fat coating comprising from 2 to 8% of the total weight of the food.

7. An improved method for feeding a dog which comprises:
(a) preparing a nutritionally-balanced dog food comprising fat, protein, carbohydrates, vitamins minerals, and a palatability, enhancer which consists of magnesium oleate admixed with at least a portion of the fat in an amount effective to improve the palatability of the dog food for dogs; and
(b) feeding the food admixed with water to a dog.

8. An improved method according to claim 7 wherein the moisture content of the dog food is less than 15%, based on the total weight of the dog food.

9. An improved method according to claim 7 wherein the magnesium oleate is blended with a fat prior to being coated on the surface of the dog food, the fat coating comprising from 2 to 8% of the total weight of the food.

* * * * *